United States Patent [19]

Hosoi et al.

[11] Patent Number: 4,565,358
[45] Date of Patent: Jan. 21, 1986

[54] PLATE POSITIONING APPARATUS

[75] Inventors: Kinji Hosoi, Machidashi; Hisao Kobayashi, Uenoharamachi; Hiroyuki Takeda, Yokohamashi; Mitsuyoshi Hibino, Machidashi, all of Japan

[73] Assignee: Nihon Early Kabushiki Kaisha (Japan Early Co., Ltd.), Tokyo, Japan

[21] Appl. No.: 472,118

[22] Filed: Mar. 4, 1983

[30] Foreign Application Priority Data

Mar. 12, 1982 [JP] Japan ............................. 57-33911[U]

[51] Int. Cl.⁴ ............................................. B23Q 3/18
[52] U.S. Cl. ....................................... 269/60; 269/73; 269/295; 269/303; 269/316; 269/319
[58] Field of Search ................... 269/60, 73, 253, 290, 269/292, 293, 295, 303, 306, 316, 319; 82/32

[56] References Cited

U.S. PATENT DOCUMENTS

| 971,146 | 9/1910 | Repp | 269/304 |
|---|---|---|---|
| 2,340,805 | 2/1944 | Garberding | 269/319 |
| 2,790,495 | 4/1957 | Schilha | 269/319 |
| 4,013,280 | 3/1977 | Chitayat et al. | 269/60 |
| 4,434,693 | 3/1984 | Hosoi et al. | 269/73 |

FOREIGN PATENT DOCUMENTS 120946 9/1980 Japan .................................. 269/303

Primary Examiner—Frederick R. Schmidt
Assistant Examiner—Judy J. Hartman
Attorney, Agent, or Firm—Wenderoth, Lind & Ponack

[57] ABSTRACT

A plate positioning apparatus which determines the position of a plate workpiece for a processing machine by an aligning member which moves in the X-axis direction and an aligning member which moves in the Y-axis direction. The Y-axis aligning member is provided with a movable retainer which retracts toward the Y-axis side when it comes in contact with the X-axis side aligning member and comprises a base part and an extension member which is remountable on the base part. The aligning member for the X-axis is provided on its upper surface with at least one aligning bar which contacts the plate workpiece. The aligning members for both directions of X and Y axes are adapted to be guided by the base frame and their moving strokes are controlled by position detecting switches provided in the base frame, the base frame being closed at its upper side by the cover plate. The respective slits along which the aligning members move are covered with respective movable dust-proof belts.

13 Claims, 15 Drawing Figures

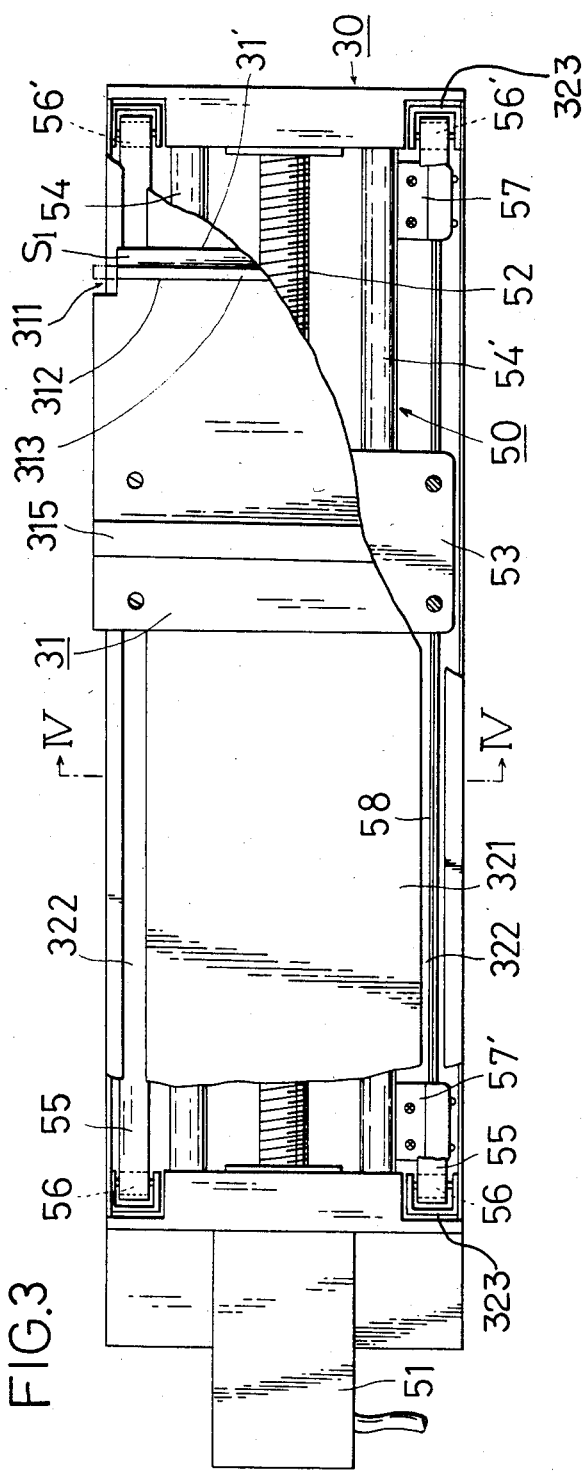
FIG.3
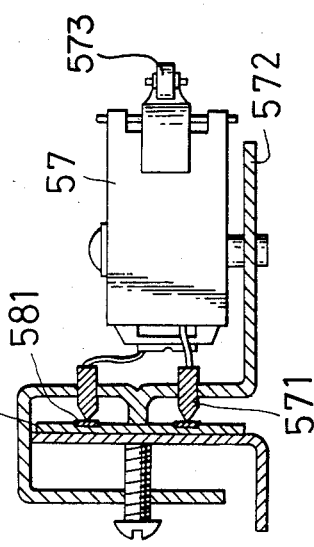
FIG.6
FIG.5

FIG.7
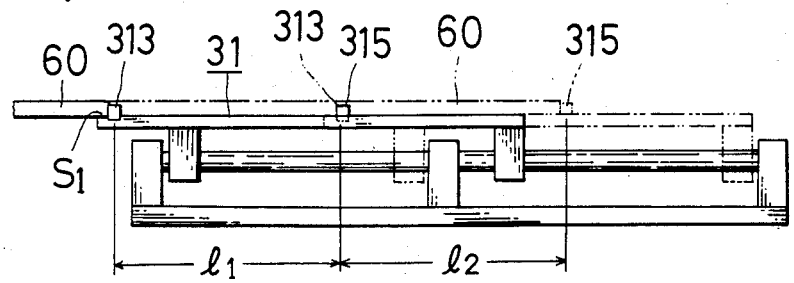
FIG.8
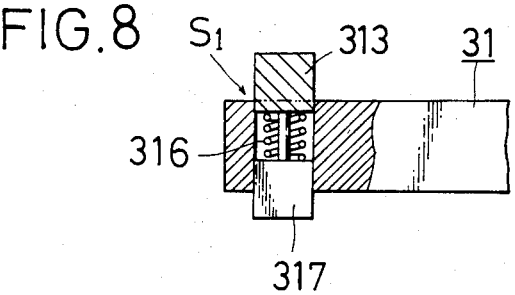
FIG.9
FIG.10
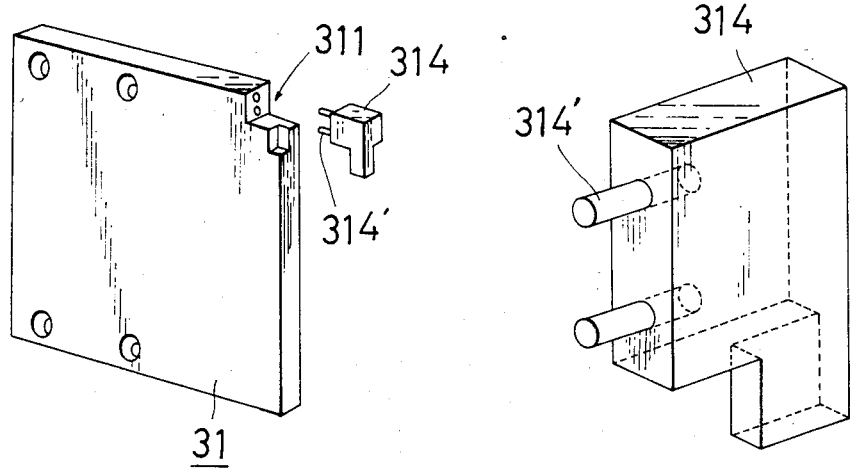

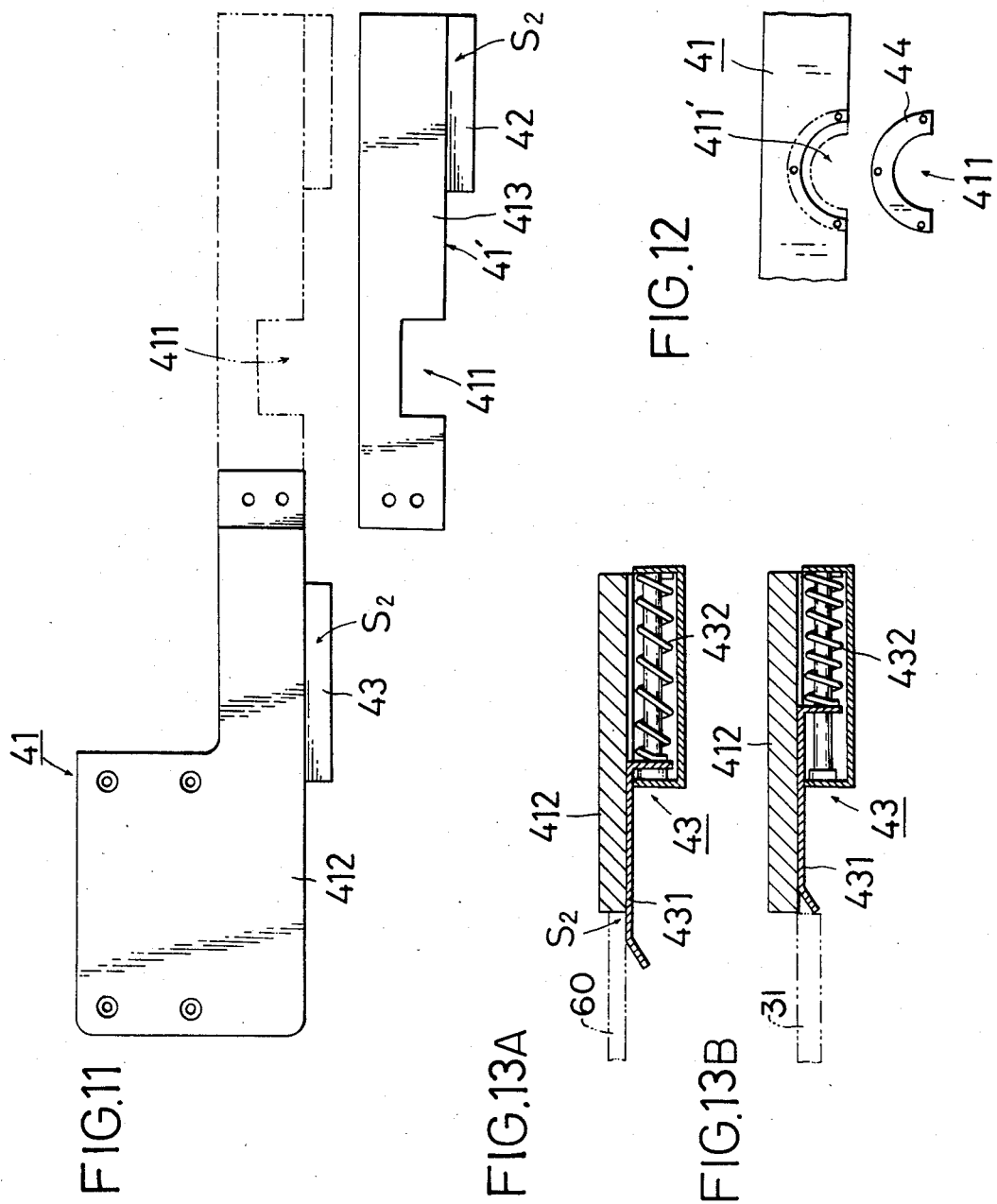

PLATE POSITIONING APPARATUS

BACKGROUND OF THE INVENTION

The present invention relates to a plate positioning apparatus for use in plate workpiece processing machines such as punching machine for plate working presses or in dripping work such as for drip coating devices for dripping liquid synthetic resin onto buttons.

The conventional apparatus of this type is disclosed in U.S. Pat. No. 4,434,693. This apparatus is constructed so that two aligning members are arranged to move independently in respective orthogonally intersecting directions, that is in the X-axis direction and the Y-axis direction.

In this conventional apparatus, a plate workpiece must be accurately positioned by the aligning members. The conventional apparatus of this type is disadvantageous in that a positional misalignment occurs in the case having a plate workpiece of a large area since the plate workpiece is positioned only by applying the respective plate workpiece to the end faces of the aligning members. An object of the present invention is to provide an apparatus which depressingly holds two adjacent sides of a plate workpiece by an X-axis side aligning member and a Y-axis side aligning member and firmly supports and maintains the plate workpiece by a protrusion provided on the Y-axis side aligning member to support the edege of the plate workpiece.

Another object of the present invention is to provide an apparatus capable of preventing the intrusion of dust ino the base frames which guide the aligning members by completely covering the upper side of each base frame.

A further object of the present invention is to provide an apparatus of the above type with a movable position detecting switch in each base frame so as to provide the capability of freely setting the stop position of the aligning member divided thereby.

A still further object of the present invention is to provide an apparatus of the above type having a means for filling a notched part provided in the X-axis side aligning member if required. Another object of the present invention is to provide an apparatus of the above type having at least one aligning bar on the X-axis side aligning member so as to provide the capability of supporting the edge of the plate workpiece by the aligning bar as well as by the front edge of the X-axis side aligning member.

SUMMARY OF THE INVENTION

The plate positioning apparatus in accordance with the present invention comprises an X-axis direction control mechanism, Y-axis direction control mechanism and a control device which drives these control mechanisms, the X-axis direction control mechanism being provided with an X-axis side aligning member and a driving part for moving said aligning member in the X-axis direction with a signal from said control device and the Y-axis direction control mechanism being provided with a Y-axis side aligning member positioned at right angles to the X-axis side aligning member and a driving part for moving said aligning member in the Y-axis direction with a signal from the control device, wherein a protrusion consisting of a movable retainer and a spring means which always urges the movable retainer to protrude toward the X-axis side aligning member is provided on a front edge of said Y-axis side aligning member which is opposed to the X-axis side aligning member.

The X-axis direction control mechanism and the Y-axis direction conrol mechanism of this apparatus have respective base X- and Y-axis side frames which guide the X- and Y-axis side aligning members provided at right angles to each other.

Both base frames are provided with cover plates on which the aligning members are respctively loaded.

A slide is moved in the axial direction in a grove in each base frame by a transfer means of the driving part under the corresponding cover plate. Each slide is connected to the corresponding aligning member through the groove. Respective dust-proof belts which move together with the slides are provided inside the grooves, and cover the slides.

At least one detection switch whose position can be changed in the axial direction of a base frame is provided on one or both of the base frames and the stop position of the slide is set by the detection switch.

The Y-axis side aligning member is provided with a recessed part which is open at its front edge, while the tip part against the Y-axis side of the X-axis side aligning member is provided with a notched part. This recessed part and the notched part are connected when both aligning members are at their foremost positions to form a space, which, when the apparatus is used in a punching machine, permits passing of the punch, just below the operating point at the side of the punching machine, and the X-axis side aligning member is provided with hollow space eliminating means to fill said space as required. The X-axis side aligning member is provided with at least one aligning bar to change the supporting position for the plate workpiece.

BRIEF DESCRIPTION OF THE DRAWINGS

In order that the invention may be more fully understood, preferred embodiments are now described with reference to the accompanying drawings, in which:

FIG. 3 is a plan view of the X-axis direction control mechanism employed in the apparatus of FIG. 2, FIG. 5 is a front view of the control switch employed in said apparatus, FIG. 6 is a perspective view of the pattern printed circuit board employed in the switch of FIG. 5, FIG. 7 is a rough side view showing the operation of the X-axis direction control mechanism of FIG. 3, FIG. 8 is a partly cut away side view of the principal part showing the embodiment of an X-axis side aligning member which can be employed in the control mechanism of FIG. 3, FIG. 9 is a perspective view showing another embodiment of the X-axis side aligning member, FIG. 10 is an enlarged perspective view of the auxiliary member employed in the aligning member of FIG. 9, FIG. 11 is a disassembled plan view of a Y-axis side aligning member employed in the apparatus of the present invention, FIG. 12 is a plan view of the principal part showing another embodiment of the Y-axis side aligning member, FIGS. 13A and 13B are cross-sectional side views showing an embodiment of the protrusion employed in the Y-axis side aligning member, in which, FIG. 13A shows the movable support member at the advanced position and FIG. 13B shows the movable support member at the retracted position.

DETAILED DESCRIPTION OF THE PREFERRED EMBODIMENTS

Figure 1:
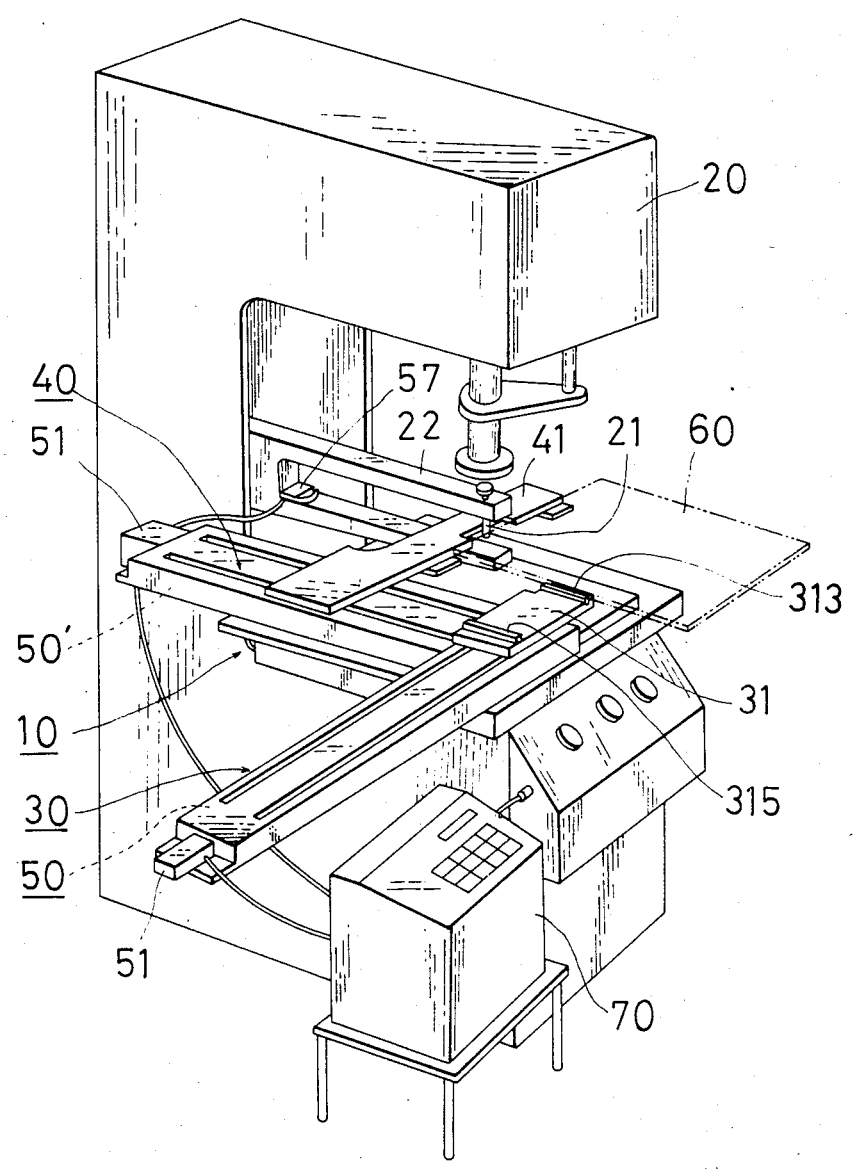
FIG. 1 is a perspective view of the press punching device employing the apparatus in accordance with the present invention.

The following describes the apparatus in accordance with the present invention referring to the accompanying drawings. FIG. 1 shows the apparatus 10 of the present invention which is employed in a punch machine. In this embodiment, the X-axis direction control mechanism 30 (hereinafter referred to as the "X control mechanism") is arranged to move the X-axis side aligning member 31 in the horizontal transversal direction of the punching machine 20 and the Y-axis direction control mechanism 40 (hereinafter referred to as the "Y control mechanism") is arranged to move the Y-axis side aligning member 41 in the horizontal cross direction of the punching machine 20.

Figure 2:
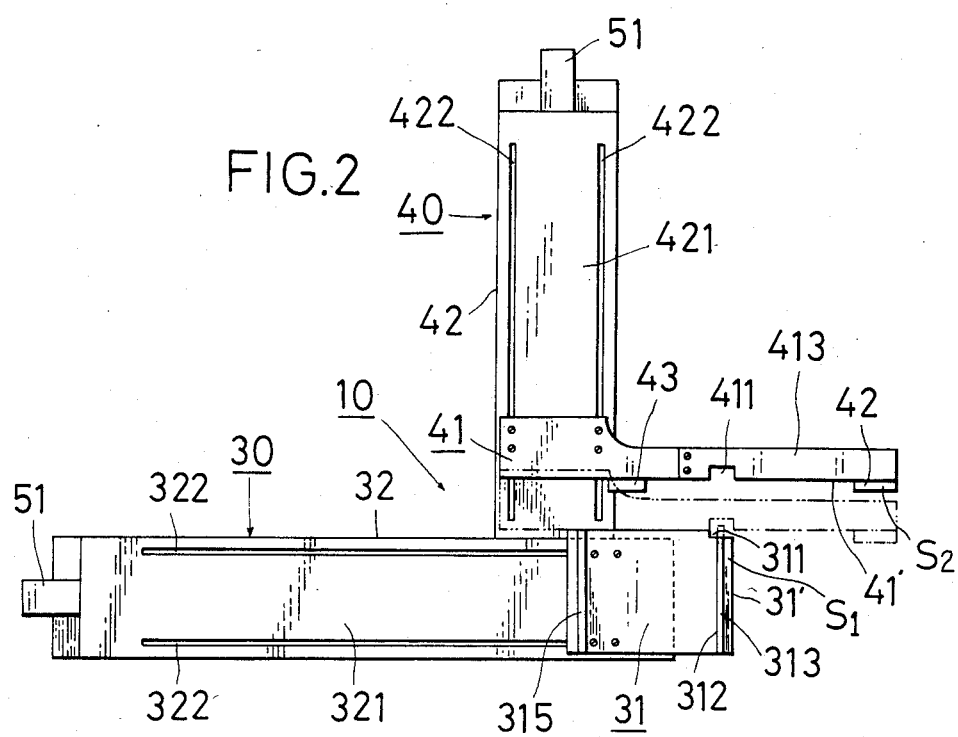
FIG. 2 is a plan view of the apparatus of the present invention.

Referring also to FIG. 2, the above two control mechanisms 30 and 40 are provided with slender base frames 32 and 42, respectively, and the base frame 42 of the Y control mechanism 40 is positioned orthogonally to the body of the base frame 32 of the X control mechanism 30.

The above control mechanisms 30 and 40 respectively incorporate driving parts 50 and 50' of similar construction which have feeding means for reciprocating aligning members 31 and 41 in the lengthwise direction of the base frames 32 and 42 and the driving means for driving said feeding means.

The feeding means is preferably capable of feeding aligning members 31 and 41 at stepless feed rates. For example, rack gears on which the aligning members are fixed can be reciprocated by pinion gears. In this embodiment, a reversible pulse motor 51 is employed as a driving means for each aligning member and respective screw shafts 52, which are rotated as many times as required in the forward and reverse directions, are employed as the feeding means, and the aligning members 31 and 41 are reciprocated by rotation of the screw shafts 52. For this purpose, as is illustrated in FIGS. 3 and 4 with respect to aligning member 31, aligning members 31 and 41 are respectively provided with a slide 53 at the center of which a threaded hole 531 which engages with the screw shaft 52 is provided so that the slide 53 is moved by rotation of the screw shaft 52.

To smooth movement of slide 53, through holes 532 and 532' are provided in parallel to threaded hole 531 at both sides of slide 53 and guide shafts 54 and 54' are respectively inserted into these through holes. The base frames 32 and 42 are covered with cover plates 321 and 421 at their top surfaces and have respective grooves 322 and 422 (at least one groove in each base frame) which extend in the lengthwise direction of the respective base frames and open through the cover plates 321 and 421. Slides are respectively coupled to 53 aligning members 31 and 41 through grooves 322 and 422. In the embodiment grooves 322 and 422 are provided at both sides of the respective base frames 32 and 42 to couple the aligning members 31 and 41 to the respective slides 53 through both sides of said base frames.

The dust-proof belt 55 is extended inside said grooves 322 and 422 to close these grooves 322 and 422.

Figure 4:
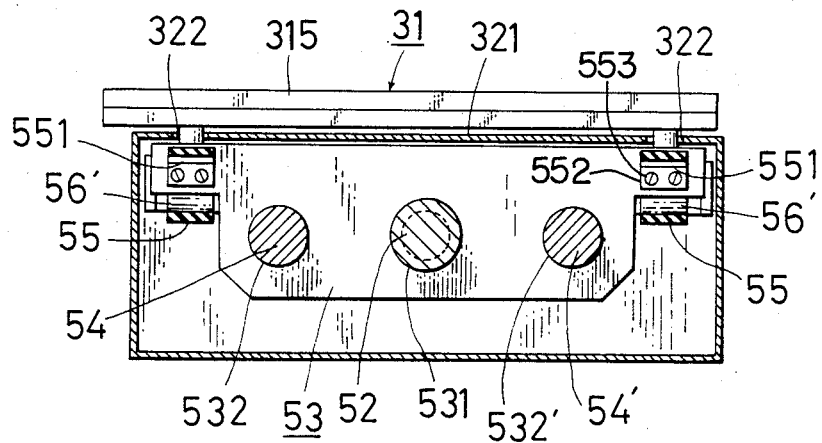
FIG. 4 is a cross-sectional view along the IV—IV line shown in FIG. 3.
Figure 14:
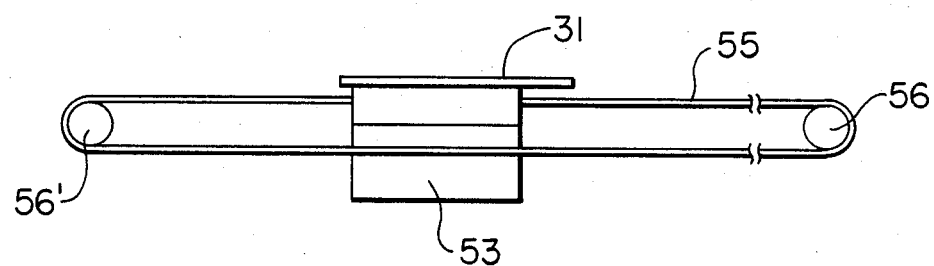
FIG. 14 is a schematic side cross-sectional view of the belt and aligning member arrangement of FIGS. 3 and 4.

Reffering to FIGS. 3 and 4, dust-proof belts 55 are secured by fixing their ends 551 at the axially forward and rearward ends of the slide 53 by plates 552 and screws 553 (only the rearward end of slide 53 being shown in FIG. 4) and are guided by the guide rollers 56 mounted to brackets 3Z3 fixed to base frame 32 and 56' and can close the grooves 322 at all times while rotating as the slide 53 moves. The belts 55 for closing grooves 422 are similarly mounted on base frame 42 and slide 53 thereof. A pair of detection switches 57 and 57', having detection elements 573 contacting the aligning members 31 and 41 and thereby detecting their presence, are provided in each of the base frames 32 and 42 to control the advanced position and retracted position of the slides 53 and are set so that the motors 51 are stopped or reversely rotated when the respective slide 53 drives the switches 57 and 57'. Though there is no problem in the X-axis direction as to the stroke of the corresponding slide 53, said stroke should be adjusted in accordance with the construction of the punch machine to be installed, and therefore switches 57 and 57' are preferably constructed so that they can be moved for positional adjustment. For this reason, switches 57 and 57', as shown in FIGS. 5 and 6, are electrically connected to an axially longated pattern printed circuit board 58 provided in the base frames 32 and 42 so as to be displaceable and to receive the power from the power supply circuit 581 of printed circuit board 58.

The switches 57 and 57' are mounted respective on members 572 which have contact pieces 571 electrically contacting the power supply circuits 581 (pairs of parallel, axially elongated electrically conductive terminals, connected to a control device 70) on circuit boards 58. The mounting members 572 have screw and bracket arrangements which permit them; and thus contact piece 571, to be positioned at desired axial positions along the terminals of the printed circuit boards 58.

The aligning member 31 of the X control mechanism 30 has a shaped notched part 311 at its extreme end part facing the Y control mechanism 40 and is designed so that it is positioned at the most advanced position when notched part 311 reaches just under the tool of the machine with which the apparatus is when employed, that is, the notched part 311 reaches just under the punch 21 of the punching machine 20.

Accordingly, when a portion of the plate workpiece near its corner is to be punched, the corner of the plate workpiece engages with the notched part 311 and the control in the x-axis direction may be impaired.

To avoid such engagement, the X-axis side aligning member 31 is provided with a hollow space eliminating means, which is, in the embodiment, a recess 312 which extends orthogonally to the forward direction of the aligning member (the X-axis direction) in the extreme (forward) end part of the aligning member 31 as shown in FIG. 2 and a rod 313 inserted in recess 312 so as to permit changing of the position of rod 313 in the recess in the Y-axis direction. The control of a plate workpiece 60 in the X-axis direction can be maintained by moving said rod 313 so as to protrude into the notched part 311 as shown with a broken line in FIG. 2. Alternatively, an auxiliary member 314 which can be freely remounted into the notched part 311 can be employed as the hollow space eliminating means as shown in FIGS. 9 and 10. In this case, the auxiliary member 314 can be easily mounted and demounted if the auxiliary member 314 is fixed to the notched part 311 by inserting the pins 314', which are provided in auxiliary member 314, into the wall of the notched part 311. Returning new to the first embodiment, if the rod 313 is fitted to said aligning member 31 as described above, the outer edge of the plate workpiece 60 comes in contact with the L-shaped space S1 formed by the rod 313 and the aligning member 31 and therefore the position of the plate workpiece 60 can be accurately maintained.

In this case, if a second rod 315 is provided behind the first rod 313, the outer edge of the plate workpiece 60 can be moved by the first rod 313 as far as the distance l1 between the first rod 313 and the second rod 315 as shown in FIG. 7. If the aligning member 31 is moved up to the most advanced position while the plate workpiece 60 is engaged by the first rod 313, and the plate workpiece 60 is then retracted (as by hand) until it comes in contact with the second rod 315 at the same time the aligning member 31 is retracted to its original position, the plate workpiece 60 can be pushed forward by the second rod 315 as far as the same stroke as for the first rod 313 by said second rod 315. While the workpiece 60 is in contact with rod 315, rod 313 is either removed, or retracted inward by solenoid 317 in the case of the embodiment illustrated in FIG. 8 as discussed below. In FIG. 7, reference number 313 with a phantom lead line designates the first rod when aligning member 31 is in its retracted position, while reference numeral 315 with a full line lead line designates the second rod when the aligning member 31 is in its advanced position. Plate workpiece 60 whose length in the X-axis direction is two times the advancing stroke l2 of the aligning member 31 can be completely machined if during such movements the advancing stroke l2 of the aligning member 31 from the retract position to the advanced position is the same as the distance l1 between the first rod 313 and the second rod 315.

As shown in this embodiment, two rods are generally provided but more than three rods can be provided depending on the size of the aligning member 31.

The first rod 313 can be adapted so that it is always caused to protrude by a spring means 316 from the surface of the aligning member 31 except when energized to retract into the aligning member 31 by, for example, a signal from the control means, as shown in FIG. 8.

In this case, for example, an electric driving means such as a solenoid 317 can be provided on the first rod 313.

The forward end parts of the X and Y-axis side aligning members 31 and 41 are generally formed as the straignt edges 31' and 41'. The X and Y-axis side aligning members 31 and 41 are set so that the front edges 31' and 41' of the aligning members 31 and 41 form a right angle if the Y-axis side aligning member 41 contacts the lateral side of the X-axis side aligning member 31 when the X-axis side aligning member 31 advances so that the notched part 311 is positioned just below the punch 21. At this time, the cutaway recession 411 which communicates with the notched part 311 of X-axis side aligning member 31 is formed at the straight edge 41' of Y-axis side aligning member 41 so that a cutaway space which permits the passing movement of said punch 21 is formed just below the punch 21 as shown in FIG. 2.

The Y-axis side aligning member 41 is preferably constructed so that the size of the cutaway recess 411 may be varied to match the cutaway recess 411 with the size of the punch 21 of the machine such as the press work machine on which the apparatus of the present invention is mounted. In the embodiment, therefore, the aligning member 41 is divided into the base part 412 and the extension member 413 as shown in FIG. 11 and a plurality of cutaway recesses 411 of different sizes are prepared as respective extension members 413 for alternative mounting on the base part 412.

Thus, the cutaway recess 411 can be suited to the punch 21 by replacing the extension member 413 with one of different size cutaway recess 411.

For varying the size of the cutaway recess 411, a large notched part 411' can be formed in advance in the aligning member 41 as shown in FIG. 12 and a plate type auxiliary member 44 having a cutaway recess 411 of the specified size can be overlapped on said notched part 411'. Thus, it is advantageous to only prepare many types of small-size auxiliary members 44 whereby the size of the cutaway recession 411 can be easily selected.

Moreover, a number of protrusions 42 and 43 are provided at the straight edge 41' of aligning member 41 and the supporting space S2 of L-shaped section is formed by these protrusions 42 and 43 to support thereby the outer periphery of the plate workpiece 60. If the protrusions 42 and 43 are thus provided on the Y-axis side aligning member 41, the protrusion 42 of the extension part 413 does not cause any problem and can be fixed stationary relative to extension part 413, but the protrusion 43 of the base 412 obstructs the base 412 from contacting the X-axis side aligning member 31.

In the embodiment, therefore, protrusion 43 is, as shown in FIG. 13A, formed by a movable support member 431 which supports the plate workpiece 60 and a spring means 432 which urges the movable support member 431 to protrude from the base 412. When base 412 comes in contact with the X-axis side aligning member 31, support member 431 is depressed by aligning member 31 to retract toward the base 412 against the spring means 432 as shown in FIG. 13B. Y-axis side aligning member 41 is adapted so that its position is detected by the control switches 57 and 57' of the driving part 50', and the reciprocating stroke of the Y-axis side aligning member 41 is often limited by the mechanical component such as the punch holder 22.

Therefore, the rear switch 57' for detecting the retracted position of the aligning member 41 is preferably constructed to be remountable, as shown in FIG. 1, at a desired position of the machine on which the apparatus is mounted. Thus it is advantageous in that the retracted position of the Y-axis side aligning member 41 can be freely set so that aligning member 41 corresponds to the construction of the machine.

The driving parts 50 and 50' which drive the X and Y-axis side aligning members 31 and 41 are automatically controlled by the control device 70.

The control device 70 is adapted to drive and control driving parts 50 and 50' by electric signals; for example, a microcomputer can be used for this purpose.

Such a control means is disclosed in, for example, the aforementioned U.S. Pat. No. 4,434,693 and the description of the control means is therefore omitted.

Needless to say, said control device 70 is not limited to the disclosed embodiment and, for example, the control device 70 can be a system which centrally controls a number of apparatuses according to the present invention.

What is claimed is:

1. A plate positioning apparatus, comprising:
   (a) a first side base frame having a length extending in a first direction;
   (b) a first side aligning member, having a side edge, and having a first front edge for contacting a first side of a plate-shaped workpiece, disposed on said first side frame for movement thereon in said first direction, in a plane;
   (c) a second side base frame fixed with respect to said first side base frame and having a length extending in a second direction perpendicular to said first direction;
   (d) a second side aligning member having a second front edge for contacting a second side of the workpiece, disposed on said second side base frame for movement thereon in said second direction in said plane, said second front edge opposing said side edge, such that said second front edge of said second side aligning member is contactable with said side edge of said first side aligning member;
   (e) first drive means for driving said first side aligning member reciprocally along said first side base frame in said first direction;
   (f) second drive means for driving said second side aligning member reciprocally along said second side base frame in said second direction toward and away from said first side base frame and said second side aligning member;
   (g) means for controlling the driving of said first and second side aligning members by said first and second drive means;
   (h) a protrusion having a movable retainer, movably mounted to said second side aligning member in said plane at said second front edge, and means for urging said protrusion forward of said second front edge toward said side edge of said first side aligning member so as to be supportingly engagable with the workpiece at the second side thereof when said first and second side aligning members are spaced from each other, and so as to engage said side edge when said second front edge is free of the workpiece and said second side aligning member is driven by said second drive means toward said first aligning member; and
   (i) means for receiving said protrusion and said retainer in said second side aligning member completely rearward of said second front edge when said protrusion is engaging said side edge and second side aligning member is driven by said second drive means into engagement at said second front edge with said side edge.

2. A plate positioning apparatus in accordance with claim 1, wherein said second side aligning member comprises a base part and at least one extension member which can be freely fitted to and removed from said base part.

3. A plate positioning apparatus in accordance with claim 2, wherein a stationary protrusion is fixedly provided on said extension member.

4. A plate positioning apparatus, comprising:
   (a) a first side base frame having a length extending in a first direction;
   (b) a first side aligning member, having a side edge, and having a first front edge for contacting a first side of a pplate-shaped workpiece, said first side aligning member being disposed on said first side aligning member being disposed on said first said base frame for movement thereon in said first direction;
   (c) a second side base frame fixed with respect to said first side base frame and having a length extending in a second direction perpendicular to said first direction;
   (d) a second side aligning member having a second edge for contacting a second side of the workpiece, disposed on said second side base frame for movement thereon is said second direction;
   (e) first drive means for driving said first side aligning member reciprocally along said first side base frame in said first direction;
   (f) second drive means for driving said second side aligning member reciprocally along said second side base frame;
   (g) means for controlling the driving of said first and second side aligning members by said first and second drive means; and
   (h) means for detecting the location of at least one of said first and second aligning members respectively along said first and second side base frames, said detecting means including
      at least one circuit board having two elongated conductors extending in parallel along the length of at least one of said first and second side base frames, and
      at least one detection switch fitted to said at least one circuit board so as to be alternatively moveable along, or fixed at any selected location along and electrically connected across, said conductors, said at least one detection switch including means for sensing the presence of said at least one of said first and second side aligning members and means for transmitting a signal along said conductors indicating the presence of said at least one of said first and second side aligning members sensed by said sensing means;
   said controlling means including means, responsive to said signal, for controlling the driving of said at least one of said first and second side aligning members by at least one of said first and second drive means.

5. A plate positioning apparatus as in claim 4, wherein said at least one detection switch comprises two detection switches located at opposite ends of the length of said at least one of said first and second side base frames so as to limit the range of movement of said at least one of said first and second side aligning members to between said opposite ends.

6. A plate positioning apparatus, comprising:
   (a) a first side base frame having a length extending in a first direction;
   (b) a first side aligning member, having a side edge and having a first front edge for contacting a first side of a plate-shaped workpiece, disposed on said first side base frame for movement thereon in said first direction between an advanced position and a retracted position;
   (c) a second side base frame fixed with respect to said frist side base frame and having a length extending in a second direction perpendicular to said first direction;
   (d) a second side aligning member having a second front edge for contacting a second side of the workpiece, disposed on said second side frame for movement thereon in said second direction; said second front edge opposing said side edge;

(e) first drive means for driving said first side aligning member reciprocally along said first side base frame in said first direction between said advanced position and said retracted position;

(f) second drive means for driving said second side aligning member reciprocally along said second side base frame in said second direction toward and away from said first side base frame and said first side aligning member; said second front edge being drivable into contact with said side edge when said second side aligning member is driven by said second drive means toward said first side aligning member; said second side aligning member having a fist recess at said second front edge; said side edge and said first front edge intersecting at a front corner, said front corner having a second recess opening into said first front edge and said side edge;

(g) a solid member removably filling said second recess, said first recess opening into said second recess to define a through hole for receiving a movable tool therethrough from a direction perpendicular to said first and second directions when said solid member is removed from said second recess, said first side aligning member is in said advanced position and said second front edge is in contact with said side edge, said solid member comprising means for blocking passage of the movable tool through said through hole when said solid member is filling said second recess; and (h) means for controlling the driving of said first and second side aligning members by said first and second drive means.

7. A plate positioning apparatus as in claim 6, further comprising means for displacing a tool for contacting the workpiece such that the tool is moved through said through hole from said direction perpendicular to said first and second directions when said first side aligning member is in said advanced position and said second front edge is in contact with said side edge.

8. A plate positioning apparatus in accordance with claim 6, wherein said removably filling means comprises an auxiliary member remountably mounted in said second recess, said auxiliary member comprising said solid member.

9. A plate positioning apparatus in accordance with claim 6, wherein said first side aligning member has a groove along said first front edge, said removably filling means comprising a sliding aligning bar slidably fitted into said groove so that said aligning bar removably protrudes into said second recess, said aligning bar comprising said solid member.

10. A plate positioning apparatus, comprising:

(a) a first side base frame having a length extending in a first direction;

(b) a first side aligning member, having a side edge, a first front edge extending perpendicular said first direction, at least one aligning bar thereon extending parallel said first front edge so as to be contactable with a first side of a plate-shaped workpiece at a selected location along said length behind and above said first front edge, and means for adjusting said location, said first side aligning member being disposed on said first side base frame for movement thereon in said first direction between an advanced position and a retracted position;

(c) a second side base frame having a length extending in a second direction perpendicular to said first direction;

(d) a second side aligning member, having a second front edge for contacting a second side of the workpiece, disposed on said second side base for movement thereon in said second direction;

(e) first drive means for driving said first side aligning member reciprocally along said first side base frame in said first direction between said advanced position and said retracted position, said first drive means comprising means for pushing the workpiece in front of said first side aligning member when said at least one aligning bar is in contact with the workpiece and said first side aligning member is driven by said first drive means toward the workpiece;

(f) second drive means for driving said second side aligning member reciprocally along said second side base frame in said second direction toward and away from said first side base frame and said first aligning side member, for pushing and retracting from the workpiece; and (g) means for controlling the driving of said first and second side aligning members by said first and second drive means.

11. A plate positioning apparatus as in claim 10, wherein said first side aligning member has an upper surface, said at least one aligning bar including a rearward aligning bar and a forward aligning bar between said rearward aligning bar and said front edge, said rearward aligning bar projecting above said upper surface, said forward aligning bar being protrudable above said upper surface so as to be contactable with a plate-shaped workpiece disposed on said surface foward of said forward aligning bar, said apparatus further comprising means for retracting said forward aligning bar below said upper surface so that the plate-shaped workpiece is slideable over said forward aligning bar, into contact with said rearward aligning bar.

12. A plate positioning apparatus in accordance with claim 10, wherein one of said at least one aligning bar is freely remountably mounted on said first side aligning member.

13. A plate positioning apparatus in accordance with claim 10, wherein said first side aligning member has an upper surface, said at least one aligning bar freely protruding above said upper surface of said first side aligning member.

* * * * *